(12) United States Patent
Pilaar

(10) Patent No.: US 8,469,144 B2
(45) Date of Patent: Jun. 25, 2013

(54) INFLATABLE SOUND ATTENUATION SYSTEM

(76) Inventor: James G. Pilaar, San Francisco, CA (US)

( * ) Notice: Subject to any disclaimer, the term of this patent is extended or adjusted under 35 U.S.C. 154(b) by 0 days.

(21) Appl. No.: 13/180,463

(22) Filed: Jul. 11, 2011

(65) Prior Publication Data

US 2011/0289857 A1  Dec. 1, 2011

Related U.S. Application Data

(63) Continuation of application No. 11/432,802, filed on May 11, 2006, now Pat. No. 7,992,678.

(60) Provisional application No. 60/680,940, filed on May 12, 2005.

(51) Int. Cl.
| | |
|---|---|
| E04B 1/84 | (2006.01) |
| E04B 1/82 | (2006.01) |
| E04G 11/04 | (2006.01) |
| E04B 1/74 | (2006.01) |
| E04G 11/00 | (2006.01) |
| F16F 7/00 | (2006.01) |
| F16F 15/00 | (2006.01) |

(52) U.S. Cl.
USPC ............. 181/284; 181/207; 181/287; 52/145; 52/2.22

(58) Field of Classification Search
USPC ................. 181/284, 207, 295, 271, 285, 287, 181/30, 210, 200; 428/35.2, 35.4; 52/144, 52/145, 2.22, 2.23, 2.11, 787.11; 126/624, 126/625; 5/681, 678; 160/123, 124
See application file for complete search history.

(56) References Cited

U.S. PATENT DOCUMENTS

| | | |
|---|---|---|
| 979,310 A | 12/1910 | Kammerer |
| 2,659,110 A | 11/1953 | Carroll |
| 2,919,715 A | 1/1960 | Rockwell |
| 2,990,837 A | 7/1961 | Cushman |
| 3,332,177 A | 7/1967 | Sepp |
| 3,629,875 A | 12/1971 | Dow |
| 3,948,347 A | 4/1976 | Rutledge |
| 3,951,228 A | 4/1976 | Schnell |
| 4,155,211 A | 5/1979 | Saylor et al. |
| 4,228,869 A | 10/1980 | Bschorr |
| 4,255,907 A | 3/1981 | Lightell |
| 4,255,908 A | 3/1981 | Rosenberg |
| 4,262,045 A | 4/1981 | Cheng et al. |
| 4,452,230 A | 6/1984 | Nelson |
| 4,523,612 A | 6/1985 | Kuklo |
| 4,629,432 A | 12/1986 | Dyrkorn et al. |
| 4,773,190 A | 9/1988 | Reade |
| 4,807,405 A | 2/1989 | Borgquist |
| 4,815,050 A | 3/1989 | Kurz |

(Continued)

FOREIGN PATENT DOCUMENTS

| | | |
|---|---|---|
| EP | 0369595 A1 | 5/1990 |
| JP | S50-42621 | 4/1975 |

(Continued)

Primary Examiner — Edgardo San Martin
(74) Attorney, Agent, or Firm — Kilpatrick Townsend & Stockton LLP

(57) ABSTRACT

An inflatable, noise attenuating panel or barrier, comprised of an inflatable air chamber coated with (wrapped in or attached thereto) an acoustic barrier material, with which to construct a variety of structures that benefit from a degree of soundproofing.

23 Claims, 11 Drawing Sheets

U.S. PATENT DOCUMENTS

| | | | |
|---|---|---|---|
| 4,856,827 A | 8/1989 | Delamare | |
| 5,097,548 A | 3/1992 | Heck et al. | |
| 5,249,319 A * | 10/1993 | Higgs | 5/714 |
| 5,270,092 A | 12/1993 | Griffith et al. | |
| 5,272,284 A | 12/1993 | Schmanski | |
| 5,299,522 A | 4/1994 | Dixon, Jr. | |
| 5,334,806 A | 8/1994 | Avery | |
| 5,348,270 A | 9/1994 | Dinh | |
| 5,453,584 A | 9/1995 | Borello | |
| 5,586,594 A | 12/1996 | Shapoff | |
| 5,621,701 A | 4/1997 | Denaro et al. | |
| 5,788,184 A | 8/1998 | Eddy | |
| 5,893,248 A | 4/1999 | Beliveau | |
| 5,901,769 A | 5/1999 | Farley | |
| 5,937,595 A | 8/1999 | Miller | |
| 6,021,612 A | 2/2000 | Dunn et al. | |
| 6,053,827 A | 4/2000 | MacKay, Jr. et al. | |
| 6,115,860 A | 9/2000 | Vrzalik | |
| 6,206,654 B1 * | 3/2001 | Cassidy | 417/312 |
| 6,260,660 B1 | 7/2001 | Yoerkie, Jr. et al. | |
| 6,282,842 B1 | 9/2001 | Simens | |
| 6,332,027 B1 | 12/2001 | Guilloud et al. | |
| 6,478,110 B1 | 11/2002 | Eatwell et al. | |
| 6,513,974 B2 | 2/2003 | Malone et al. | |
| 6,755,568 B2 | 6/2004 | Malone et al. | |
| 6,802,386 B2 | 10/2004 | Koelle | |
| 6,811,852 B2 | 11/2004 | Alderman | |
| 6,860,069 B2 | 3/2005 | Morris | |
| 7,169,459 B2 | 1/2007 | Lichodziejewski et al. | |
| 7,819,221 B1 * | 10/2010 | Lane et al. | 181/206 |
| 7,992,678 B2 * | 8/2011 | Pilaar | 181/284 |
| 2002/0053279 A1 | 5/2002 | Jung et al. | |
| 2002/0059959 A1 * | 5/2002 | Qatu et al. | 138/30 |
| 2004/0074151 A1 | 4/2004 | Morris | |
| 2004/0258248 A1 | 12/2004 | Schnitta et al. | |
| 2007/0140518 A1 | 6/2007 | Larsen | |
| 2007/0151796 A1 | 7/2007 | Heid | |

FOREIGN PATENT DOCUMENTS

| | | |
|---|---|---|
| JP | 55-108105 | 7/1980 |
| JP | S59-34349 | 2/1984 |
| JP | H7-32017 | 3/1995 |
| JP | 08-234763 | 9/1996 |
| JP | 2000-319821 | 11/2000 |
| JP | 2003-041681 | 2/2003 |
| JP | 2003041681 A * | 2/2003 |

* cited by examiner

FIG. 8  Ready to use

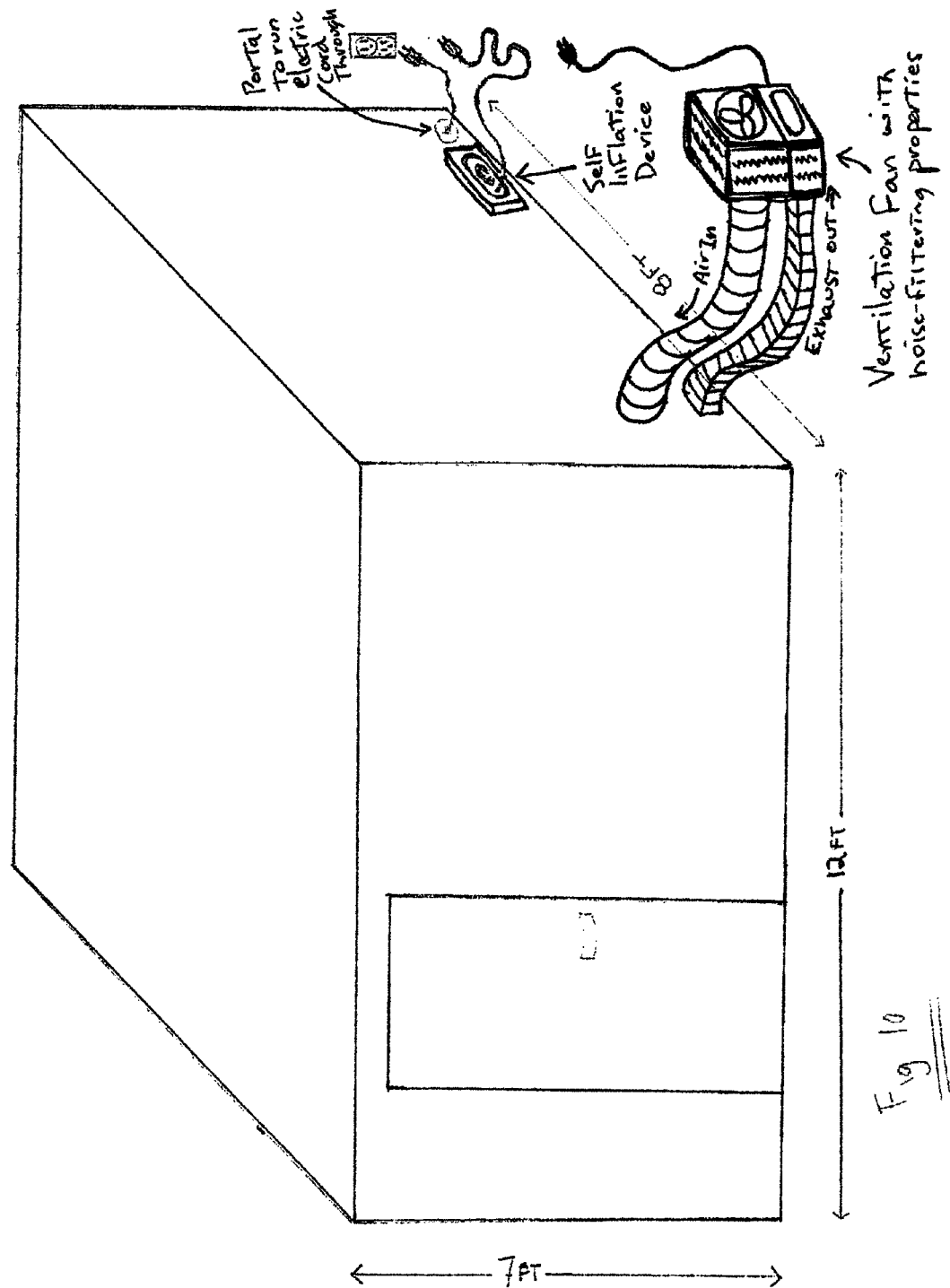

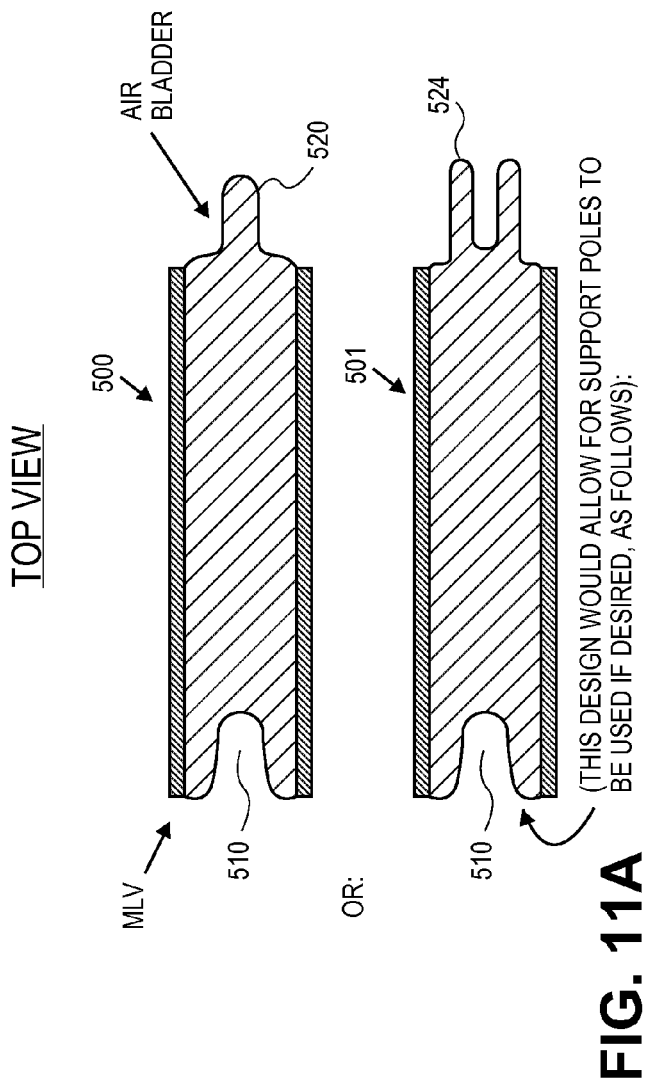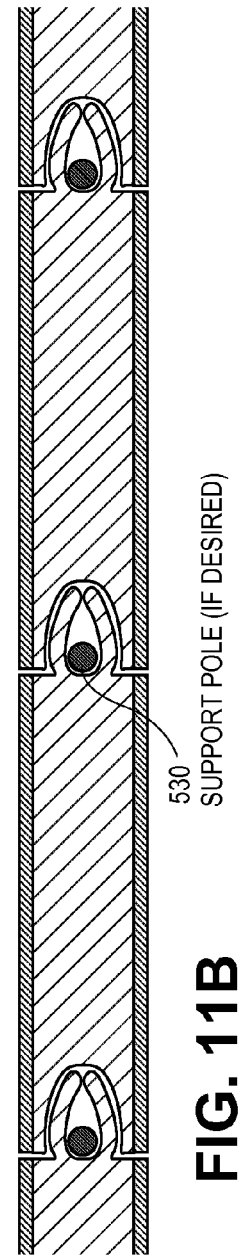

INFLATABLE SOUND ATTENUATION SYSTEM

CROSS-REFERENCES TO RELATED APPLICATIONS

This application is a continuation of U.S. application Ser. No. 11/432,802, filed May 11, 2006 now U.S. Pat. No. 7,992,678, which claims the benefit of U.S. Provisional Application No. 60/680,940, filed May 12, 2005, entitled "INFLATABLE SOUND ATTENUATION SYSTEM," the disclosures of which are incorporated herein by reference in their entireties for all purposes.

BACKGROUND

The present invention relates generally to sound attenuation devices and systems, and more particularly to inflatable sound attenuation devices and systems that are portable and flexible.

In today's society, there are often areas where it is desirable to provide sound attenuation but it is difficult to achieve. Examples include apartments, condominiums, townhouses, single family dwellings with little separation therebetween and other structures that are close together or include rooms that may benefit from sound attenuation. Occupants of these types of structures may wish to have music practice rooms or areas, home theaters, children's play areas, protection from street noise, etc., but are unable to due the lack of practical and affordable sound attenuation systems.

Furthermore, sound attenuation is sometimes desired for brief periods of time, or at short notice, in situations where it is not practical or affordable to erect permanent sound barriers. These situations might include trade shows where a company might benefit from a sound-proof booth or room for privacy concerns. Other situations might include road construction projects, where a temporary sound wall between a neighborhood and the construction area is desirable, or even in the case of a military operation, where an inflatable aircraft hanger with sound attenuation properties may be deployed during the mission and then removed (or replaced with a permanent structure) when the initial mission is complete.

Accordingly, it is desirable to provide systems and methods for constructing inflatable, hence flexible and portable, soundproofed structures for a wide variety of personal, commercial and military uses.

BRIEF SUMMARY

The present invention provides flexible and portable sound attenuation devices and systems as well as systems and methods for constructing soundproofed structures for a wide variety of personal, commercial and military uses.

The present invention provides an inflatable, noise attenuating barrier structure, including an inflatable air chamber coated with (wrapped in or attached thereto) an acoustic barrier (e.g., a mass-loaded vinyl barrier) material, with which to construct a variety of structures that benefit from a degree of soundproofing.

Depending on the size of the structure one wishes to construct, an inflatable sound attenuation system in accordance with the present invention may be deployed as a single-piece inflatable room for example, wherein the walls, ceilings and floors are all part of the same inflatable structure, or as "panels" of various sizes which are then joined together with noise attenuating coupling devices to provide walls, ceilings and other types of barriers.

The present invention provides significant soundproofing qualities as a result of both the materials and methods used to construct the air chamber barrier structure and the air cavity inside the chamber.

In certain aspects, the acoustic barrier structure includes an air chamber portion manufactured using standard techniques and materials already in use to make air mattresses and other inflatable structures (such as inflatable amusement park play structures). In one aspect, the acoustic barrier includes a mass-loaded vinyl barrier material that is commercially available. Such materials are made in varying levels of opacity (clear, semi-opaque or non-transparent), as desired, for more or less light transmission into the structures constructed with the present invention. Those skilled in the art will understand that many types of materials may be used.

The present invention combines the advantages of the properties of modern inflatable structures (light weight, portable, yet relatively strong, rigid) with those of modern noise attenuating materials (flexibility, relatively low weight per square foot compared to other older sound attenuating materials) to provide sound attenuation devices and systems that are portable, flexible and/or easy to construct.

An additional aspect of the present invention resides in the way panels of the inflatable sound attenuation system may be combined using complementary sound attenuating panel coupling devices. These couplers provide soundproofing qualities of their own to the structures they are a part of and hold together, as detailed in the attached drawings.

According to one aspect of the present invention, an inflatable sound attenuation panel is provided that typically includes an inflatable bladder that defines first and second barrier surfaces when inflated, the first and second surfaces being substantially parallel when inflated, and a sheet of sound attenuation material (SAM) attached to the first surface. In certain aspects, the SAM comprises mass-loaded vinyl (MLV).

According to one aspect of the present invention, an acoustic barrier structure is provided that typically includes at least two panels, each panel comprising at least a first sheet of sound attenuation material (SAM), and a coupler device configured to hold the at least two panels together so as to form a barrier structure. In certain aspects, the SAM comprises mass-loaded vinyl (MLV).

According to yet a further aspect of the present invention, an inflatable sound attenuation system is provided that typically includes an inflatable bladder system that when inflated defines a chamber having internal bladder surfaces and external bladder surfaces, and one or more sheets of sound attenuation material (SAM) attached to one or both of the internal and exterior surfaces. In certain aspects, the SAM comprises mass-loaded vinyl (MLV). In certain aspects, the bladder system includes a single bladder. In certain aspects, the bladder system includes multiple interconnected bladders.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The accompanying Figures illustrate various aspects and components of systems in accordance with the present invention.

FIG. 10 illustrates a one-piece inflatable structure according to one embodiment of the present invention.

FIG. 11 illustrates a top view of embodiments of inflatable panels configured with connection and support elements or features.

DETAILED DESCRIPTION

Figure 1:
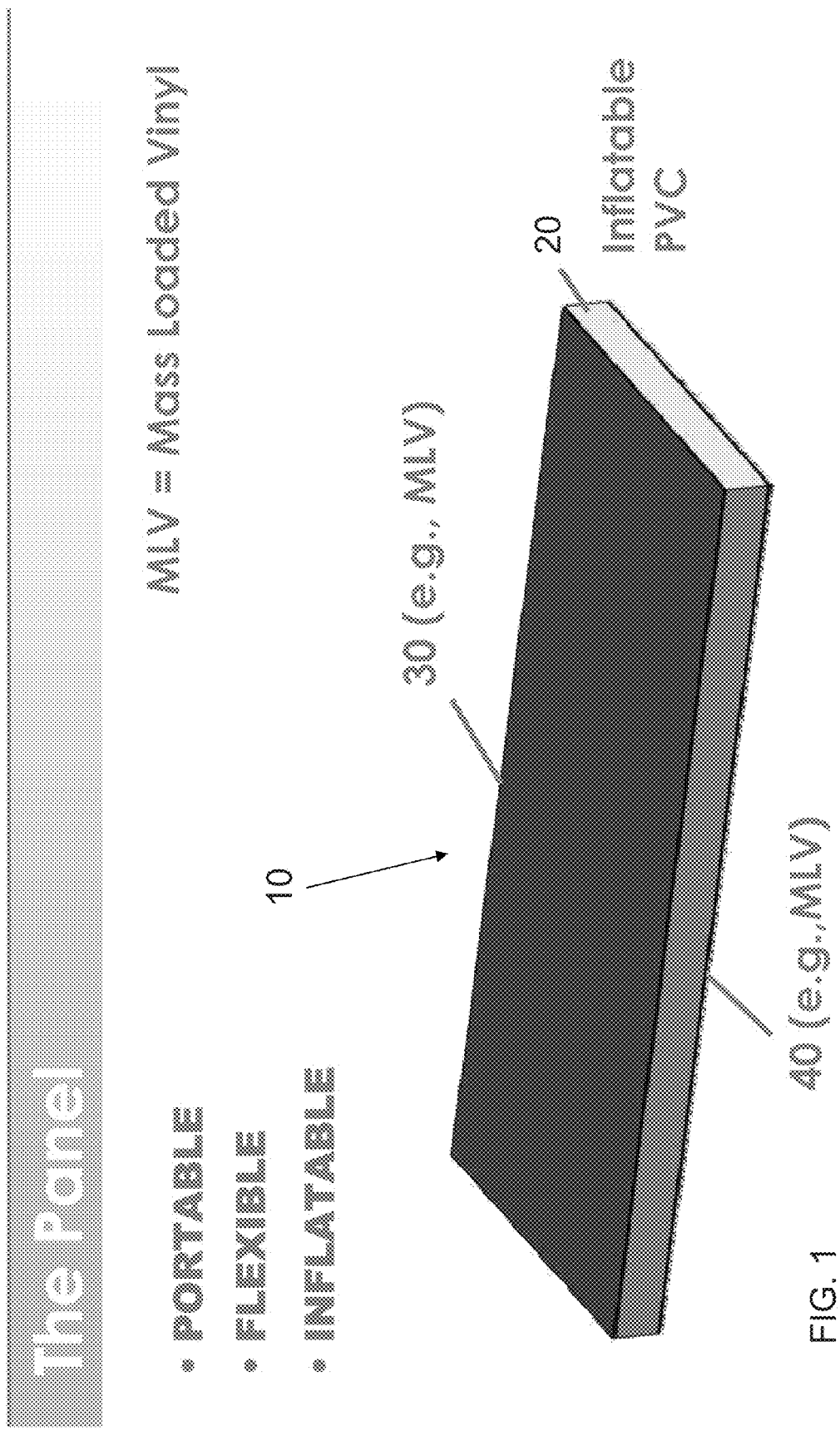
FIG. 1 illustrates a sound attenuation panel according to one embodiment.

The present invention provides sound attenuation panels and acoustic barrier structures incorporating one or more sound attenuation panels. FIG. 1 illustrates a sound attenuation panel 10 according to one embodiment. As shown, panel 10 includes an inflatable bladder 20 that when inflated with air or other fluid, e.g., liquid or gas, provides substantially planar surface shapes (e.g., parallel surfaces). In one aspect, a bladder may contain more than one fluid-receiving chamber such that different chambers may be filled with different fluids. In certain aspects, one or more surfaces might include baffles, however, the general overall shape of a surface is substantially planar and parallel to its opposite surface. The larger, parallel surfaces will be referred to herein as barrier surfaces as these surfaces typically define the sound attenuation barrier dimensions. As shown, one barrier surface includes a layer 30 of sound attenuation material attached thereto, and the other barrier surface also includes a layer 40 of sound attenuation material attached thereto. In one alternate embodiment, only one barrier surface includes a layer of sound attenuation material attached thereto. In one embodiment, the sound attenuation material includes mass-loaded vinyl (MLV), however, other materials with useful sound attenuation characteristics may be used. Examples of other useful sound attenuating materials might include PVC, lead-impregnated materials such as fabrics or plastics, and other flexible or rigid materials. MLV is a commercially available material, and can be obtained in different thicknesses and in different opacities (e.g., opaque and translucent). The bladder 30 is preferably made of PVC, polyurethane or other plastic or polymer material, and a surface of the bladder may have corrugate features (e.g., baffles) or it may have a flat contour. In certain aspects, a sound attenuation layer (e.g., material layer 30 or 40) is attached using glue or other adhesive material, however, other attachment elements such as velcro strips, ties, etc., may be used. It should be appreciated that a sound attenuation layer may include multiple sound attenuation layers (e.g., a stack of one or more sheets of the same or different materials).

Panel 10 provides advantageous sound attenuation qualities due, in part, to the sound attenuation properties of a sealed air cavity and also of the MLV layer(s). Sound waves impinging on the barrier surface are significantly attenuated not only by the sound attenuation material layer (e.g., MLV), but also by the air cavity between material layers 30 and 40. Where only one layer 30 or 40 includes a sound attenuation material attached thereto, the sound attenuation properties may not be as significant as with two layers. Also, it should be appreciated that the thickness(es) of the sound attenuation layer(s) (e.g., MLV) may be varied, and that the thickness of the bladder 20, when inflated, may be varied to optimize sound attenuation. For example, in certain situations, depending in part on the materials used and the frequencies to be attenuated, it may be desirable to have a bladder thickness (inflated) of about 6", and in other situations it may be desirable that the thickness be about 8". In general the bladder thickness may be configured to be between about 1" and about 10" or more. Also, the thickness of the sound attenuation material sheets or layers (e.g., MLV) may be between about 1 or 2 mm and about 1 or 2 inches or more. For example, larger thickness sheets may be desirable for large scale sound attenuation systems such as might be used in an aircraft hangar or other industrial setting. Also, flexible materials may be preferred due to better sound attenuation and/or absorption qualities of flexible material; sound waves typically have more trouble consistently penetrating materials having a lower stiffness and/or greater flexibility.

Figure 2:
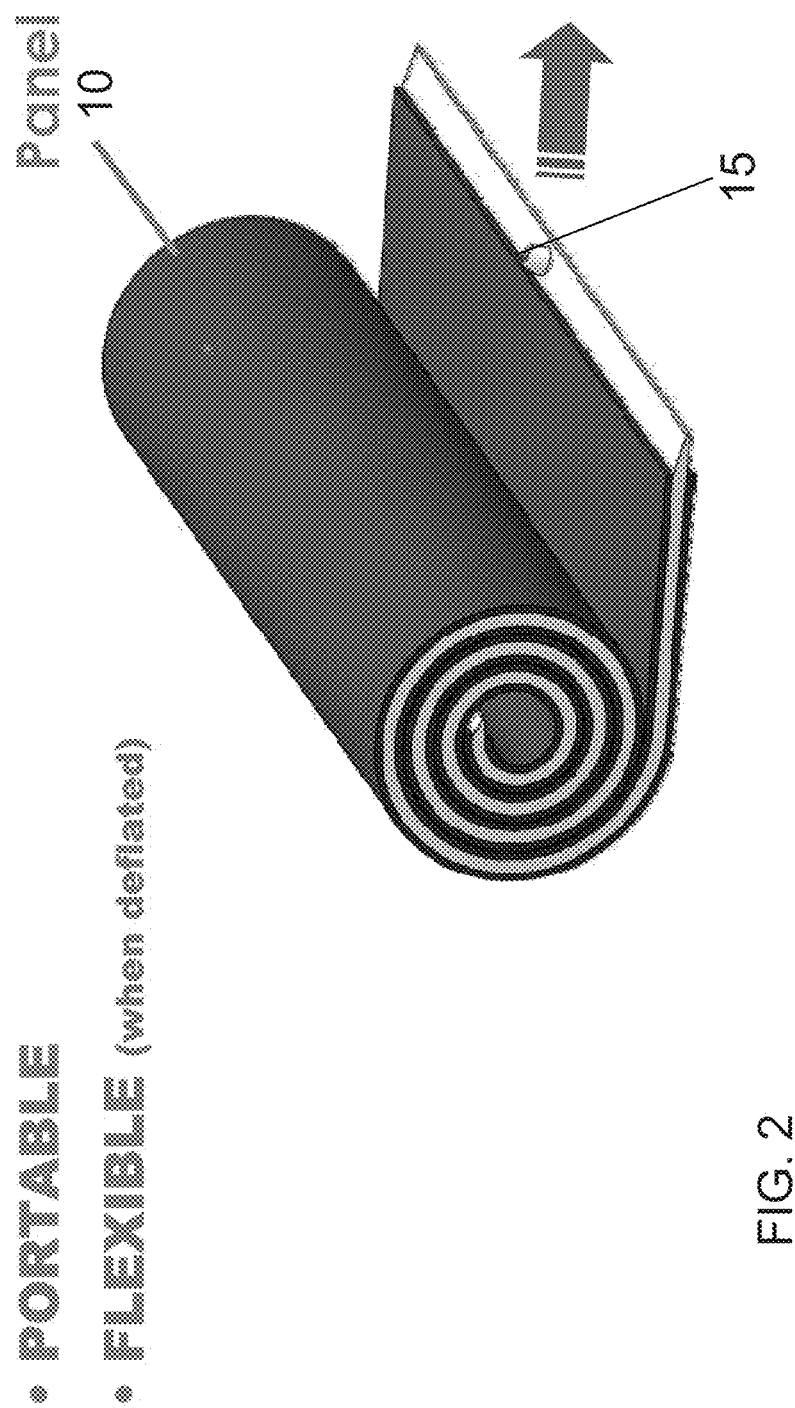
FIG. 2 illustrates the panel of FIG. 1 in a deflated state.
Figure 3:
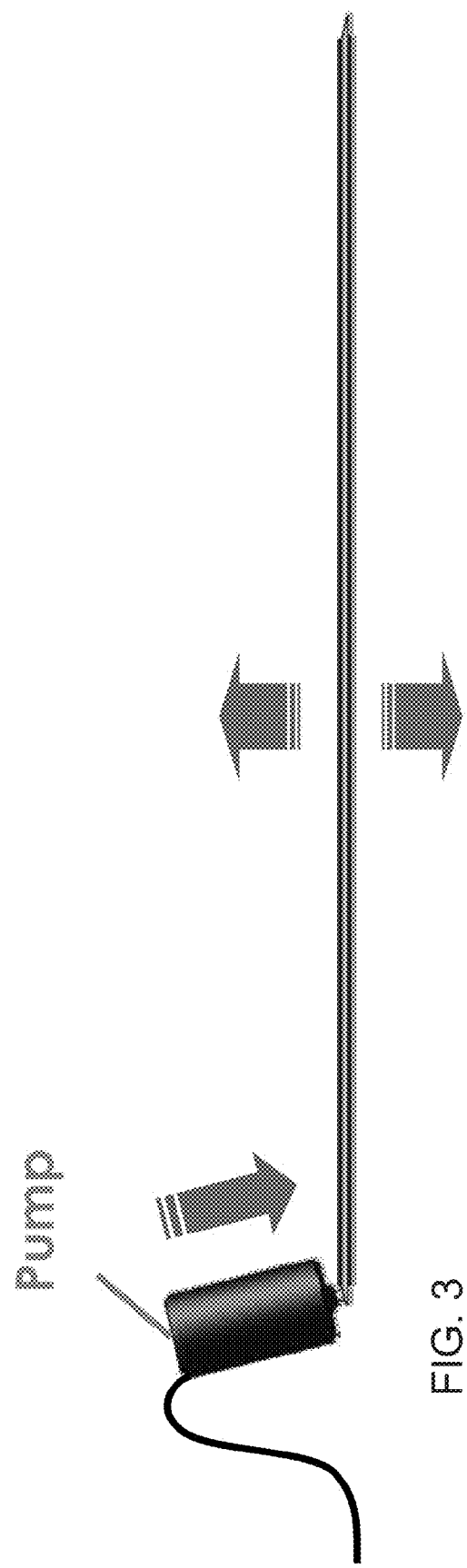
FIG. 3 illustrates a side view of a panel after inflation of the bladder using a pump mechanism.

In one aspect, panel 10 is portable and flexible to allow for ease of storage and transport. FIG. 2 illustrates a panel 10 in a deflated state. As shown, the panel in a rolled up configuration. In a rolled-up configuration, for example, panel 10 can be more easily stored and transported. As shown bladder 20 also includes valve port 15 for coupling with a pump mechanism to allow for inflation (and deflation) of bladder 20. Valve port 15 can be located on a side or a face of a bladder, and in general anywhere on a bladder as may be convenient. FIG. 3 illustrates a side view of panel 10 after inflation of bladder 20 using a pump mechanism. The storage and transport element (e.g., bag, box or crate) can in certain aspects be configured to be used as another element in a sound attenuation system, for example, a coupling element or a brace.

According to one embodiment, an acoustic barrier structure includes one or a plurality of connected panels 10. For example, a single panel can be positioned appropriately to provide a sound barrier, e.g., between rooms, or against a wall, floor, ceiling, etc. Also, multiple panels can be positioned and configured to provide an enlarged barrier or an enclosed or partially enclosed chamber. In one aspect, one or multiple panels 10 are held together using a variety of coupling devices as will be discussed below. For example, where a panel is held by a coupling device, the inflatable nature of panel 10 advantageously facilitates self sealing, and engagement with a coupling device. As the panel is inflated, the bladder and sound attenuation material layer(s) self seal, and the panel engages the interior of a coupling device, due to the biasing force of the (increasing) internal air pressure of the bladder. Also, in certain aspects, deflation of a panel facilitates separation of panels from coupling devices.

Figure 4:
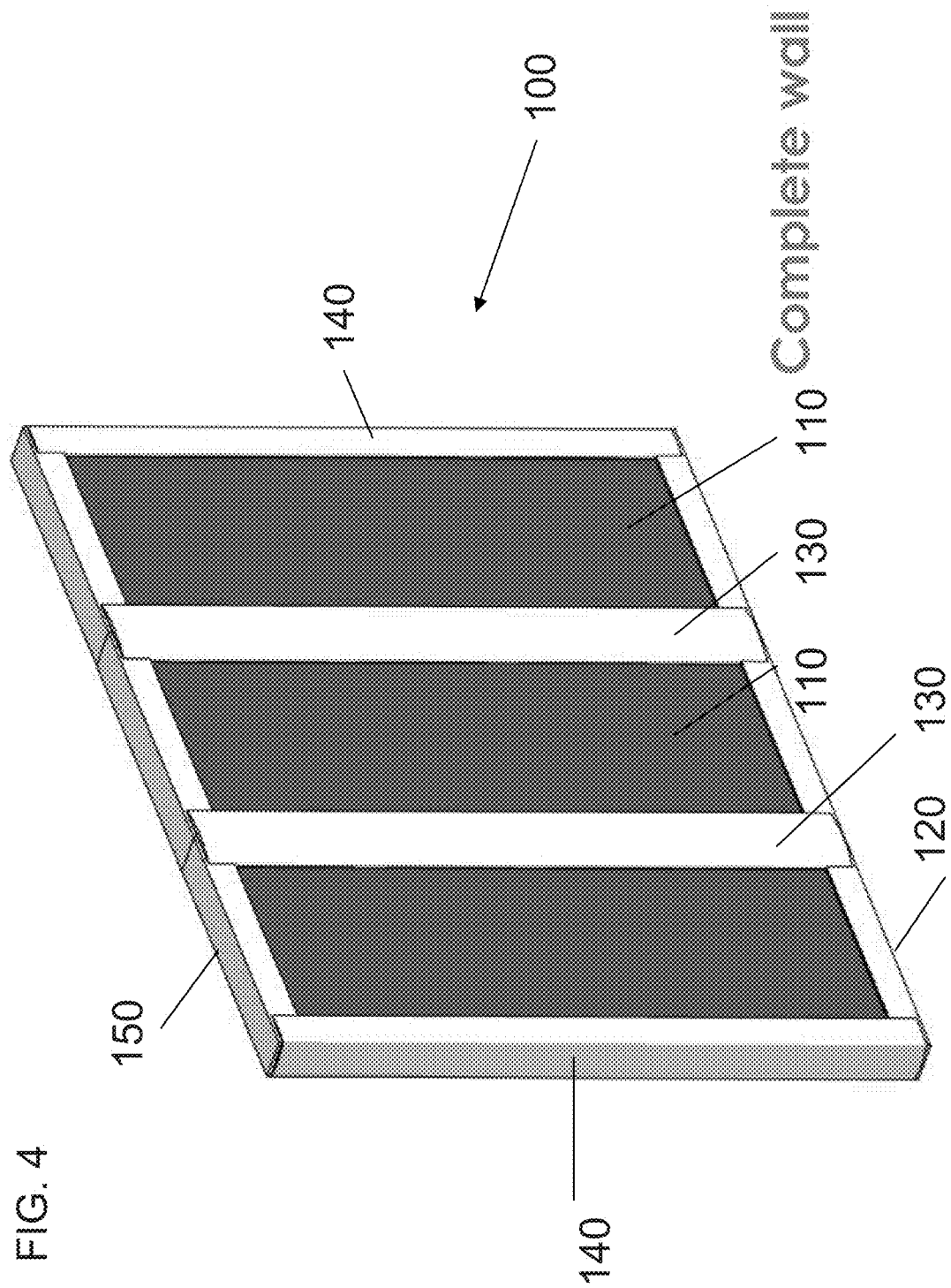
FIG. 4 illustrates an example of an acoustic barrier structure including a plurality of panels coupled together with a plurality of coupling devices to form a sound attenuation wall according to one embodiment.
Figure 5:
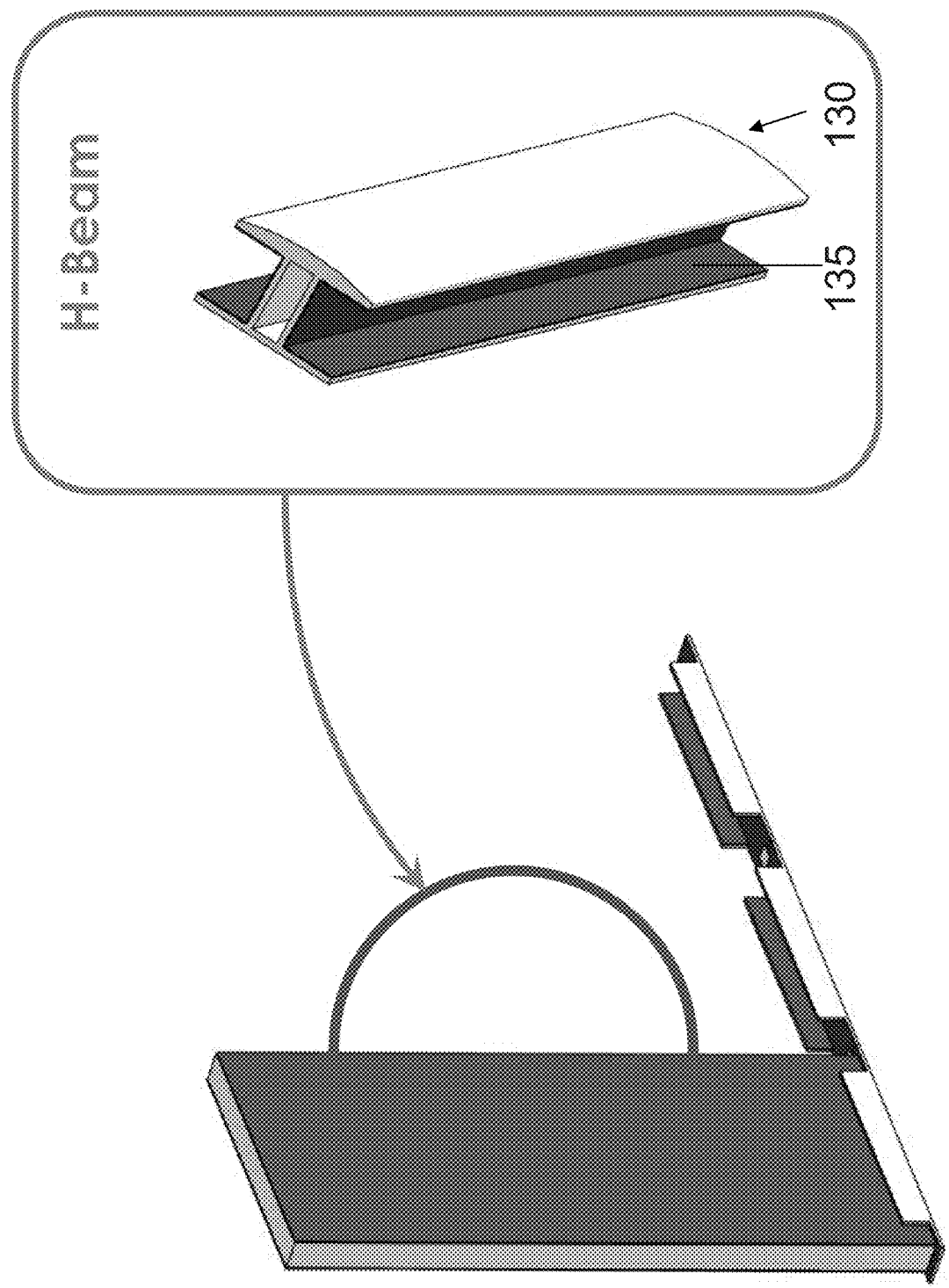
FIG. 5 illustrates a perspective view of side-by-side coupler element including a layer of sound attenuation material on an inner surface.

FIG. 4 illustrates an example of an acoustic barrier structure including a plurality of panels 110, coupled together with a plurality of coupling devices to form a sound attenuation wall 100. As shown, wall 100 includes multiple panels 110, each having an opaque sound attenuation layers (e.g., MLV) so that the wall also provides a visual barrier. It should be appreciated that any or all panels could be fabricated of translucent materials to provide a "see-through" wall. As shown, the panels 110 are coupled together using a variety of coupling devices. A floor support 120 comprising a single integrated panel holder, or multiple panel holders coupled together, provides support for the structure 100. The floor support may be coupled to a floor element or it may be free-standing. Side-by-side coupler elements (e.g., H-shaped beam elements) 130 couple two (or more) panels together linearly (at about a 180° angle) as shown and U-beam elements 140 provide outside support. The coupling devices may be modular or telescoping and/or extendable. Additional support structure 150, comprising one or multiple elements, provide support at the top of the structure 100. In certain aspects, the inner portion and/or the outer portion of a coupling device includes a layer of sound attenuation material coupled thereto to provide additional sound attenuation properties to structure 100, e.g., to prevent sound leakage at points where various elements meet. For example, FIG. 5 illustrates a perspective view of an H-beam element 130 including a layer 135 of sound attenuation material on an inner surface. In certain aspects, a panel 110 can be slid into coupling elements after inflation, e.g., a panel can be slid between two H-beam elements. Alternatively, an un-inflated, or partially inflated panel may be positioned as appropriate and inflated to enhance sealing.

Figure 6:
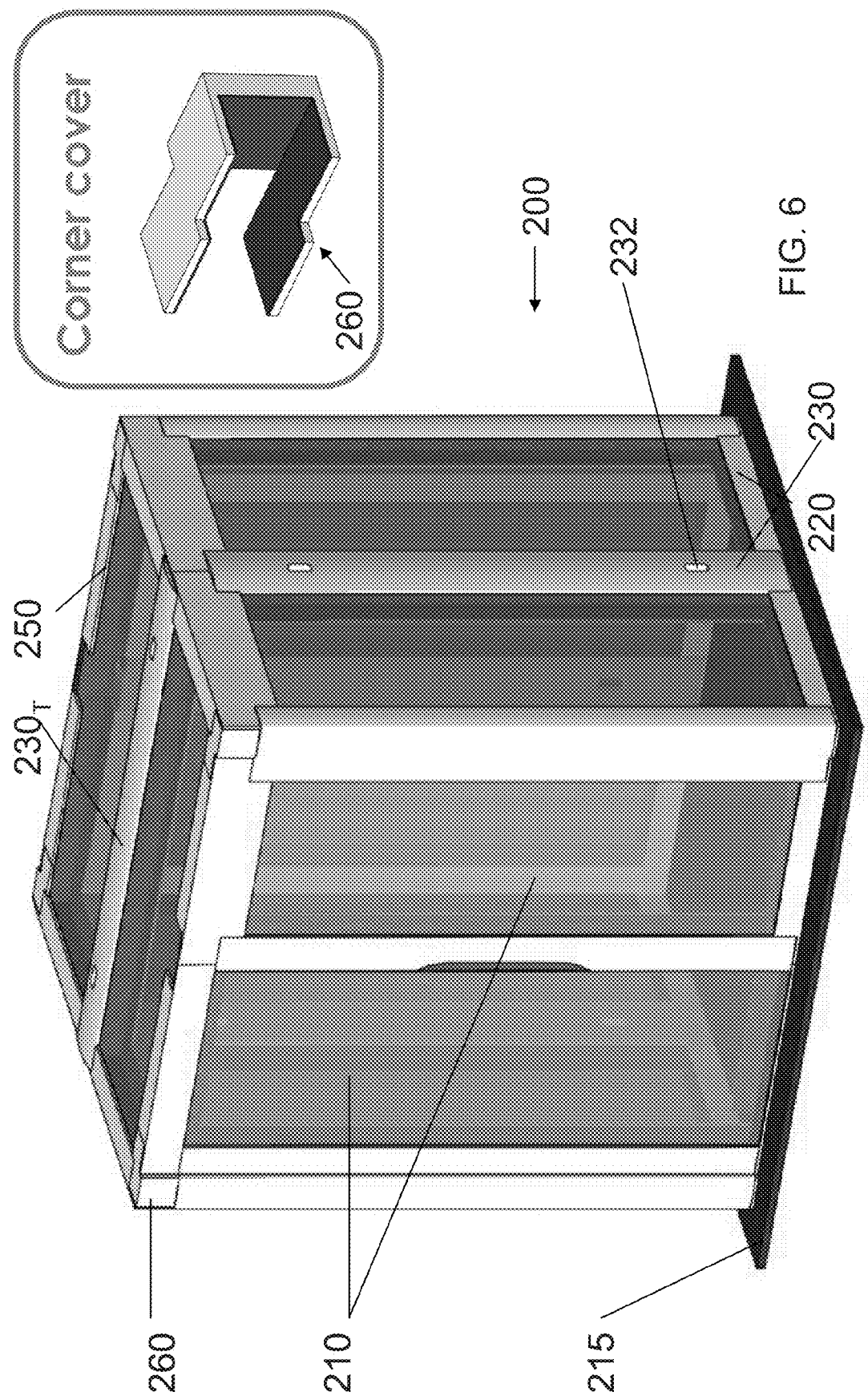
FIG. 6 illustrates an example of an acoustic barrier structure including a plurality of panels, coupled together with a plurality of coupling devices to form an enclosed sound attenuation chamber according to one embodiment.

FIG. 6 illustrates an example of an acoustic barrier structure including a plurality of panels 210, coupled together with a plurality of coupling devices to form an enclosed sound attenuation chamber 200. As shown, chamber 200 includes multiple panels 210, each having translucent sound attenuation layers (e.g., MLV) so that the chamber is "see-through". It should be appreciated that any or all panels could be fabricated of, or covered by, opaque materials. As shown, the panels 210 are coupled together using a variety of coupling devices.

Figure 7:
FIG. 7 illustrates a perspective view of a corner beam element 240 according to one embodiment.
Figure 8:
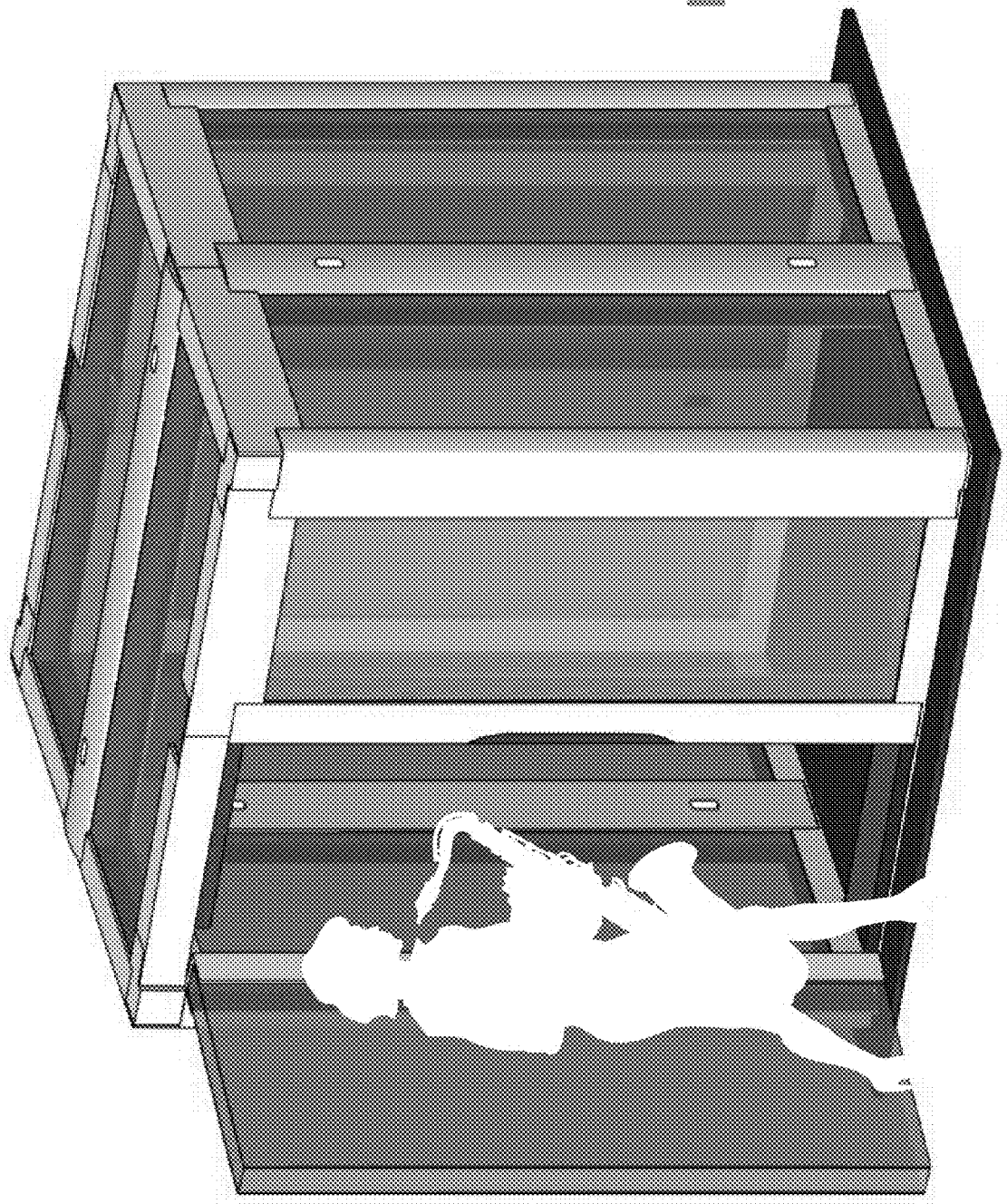
FIG. 8 illustrates an acoustic barrier chamber having a door.

A floor structure 215 comprising a single integrated panel, or multiple panels coupled together, provides support for the structure 200. The floor structure 215, in certain aspects, includes a sound attenuation material such as MLV. A floor support 220 comprising a single integrated panel holder, or multiple panel holders coupled together, provides support for the structure 200. The floor support 220 may be fixedly coupled to floor structure 215 or it may be free-standing. H-beam elements 230 linearly (at about a 180° angle) couple two (or more) panels together as shown and corner beam elements 240 provide outside support and interconnectivity for panels of different walls of the structure 200. FIG. 7 illustrates a perspective view of a corner beam element 240 according to one embodiment. Corner beam elements are configured to connect two or more panels together at a non-linear angle, e.g., other than 180° (e.g., ranging between 1 or 2 degrees and about 180 degrees). For example, as shown in FIG. 7, the corner beam elements are configured to hold two panels at about 90°. Additional top support structure beam 250, comprising one or multiple elements, provide support at the top of the structure 200 in addition to a top H-beam element 230$_T$ and corner cover elements 260. In cases where it is desirable to have a door or other entryway, e.g., for an enclosed chamber, door frame connectors may be used so that a panel structure can be opened, for example as shown in FIG. 8. Alternatively, a panel may be modified to include a sealable passageway that acts as a door. For example, the passageway, such as a doorway may include a larger bladder surrounding a smaller bladder such that the inner bladder swings in and out on a "hinge" of material attaching the two parts. Also, features can be defined in a connector to allow for air flow into and out of a barrier structure. For example, in FIGS. 7 and 8, an H-Beam element is configured with vent holes 232 as shown.

Any coupling device/connector element may include vent holes or other features as desired. It should also be appreciated that the configurations of the coupling devices shown can take on different cross-sections and shapes, e.g., rounded corners.

In certain aspects, the inner portion and/or the outer portion of a coupling device element includes a layer of sound attenuation material coupled thereto (e.g., using a glue, Velcro, etc.) to provide additional sound attenuation properties to structure 200, e.g., to prevent sound leakage at points where various elements meet. For example, FIG. 7 illustrates a perspective view of a corner beam element 240 including a layer 245 of sound attenuation material on an inner surface.

Figure 9:
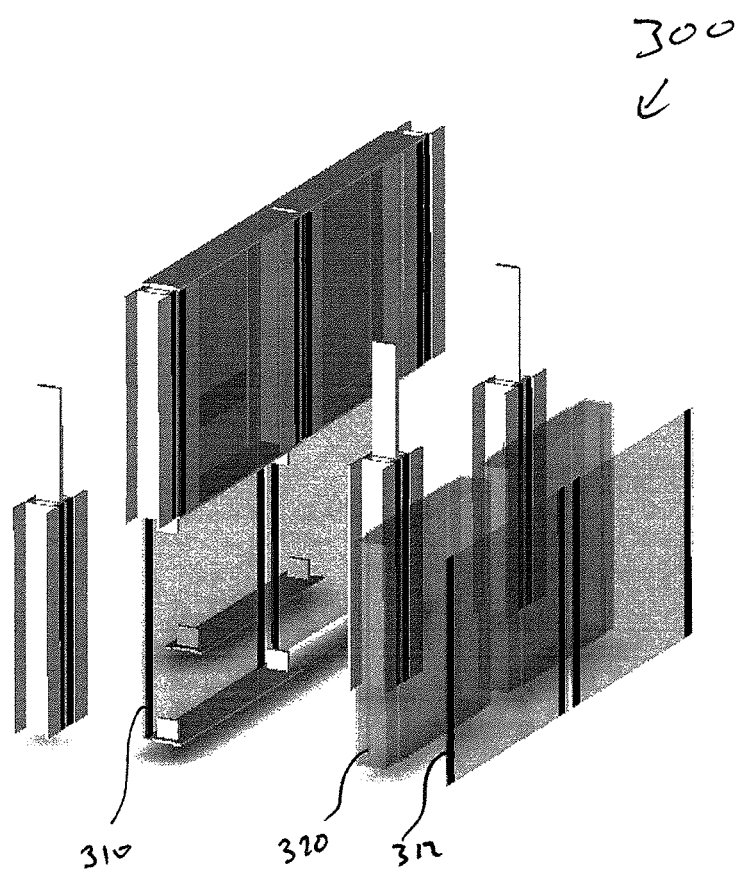
FIG. 9 illustrates a modular acoustic barrier structure according to another embodiment.

FIG. 9 illustrates a modular acoustic barrier structure 300 according to another embodiment. As shown, elements of structure 300 are separated to show various design configurations and alternatives. For example, in one embodiment, a sound attenuation panel only comprises a single sheet or layer of sound attenuating material 310, e.g., MLV. In another embodiment, a panel comprises a pair of sound attenuating sheets or layers 310 and 312, e.g., MLV, with an air gap between (no inflatable bladder), although an inflatable bladder 320 may be included as discussed above. In this embodiment, the connector elements/coupling devices hold the two sound attenuating sheets in a sealed configuration such that an air gap exists therebetween to provide the same effect as the inflatable bladder. That is, sound attenuation is enhanced by the attenuation characteristics of the air cavity. The coupling devices may be modular or telescoping and/or extendable. The sound attenuation sheets 310 and 312 may be coupled or attached to the connector elements using a glue, Velcro or other adhesive material or mechanism.

Advantageously, enclosures fabricated using the sound attenuation panels and structures of the present invention were found to have exceptional insertion losses. For example, one test enclosure was found to have insertion losses of over 50 dB at about 2,000 Hz and above, where a 10 dB reduction in sound level is perceived as halving the loudness.

Examples of Alternatives and Uses

The sound attenuation systems and devices of the present invention are preferably configurable in different shapes and sizes, allowing them to be used for a variety of purposes, including, but not limited to, the construction of the following types of sound barrier structures in which soundproofing qualities are desired:

Musical Instrument Practice Rooms
Home Recording Studios
Home Theater Rooms
Game/Play/Study Rooms
Trade Show Rooms
Factory Floor Control Rooms
Sound Deadening Walls, Ceilings and Flooring for internal use (for example, to provide temporary soundproofing to homes, apartments, townhouses and condominiums when repair work is being done in other nearby homes or units.) Such a device is light enough that it may even be attached to surfaces using heavy-duty Velcro. They may include as little one panel installed to act as a simple wall or ceiling barrier between noisy apartments.
Sound Containment Walls for external use (for example to use as temporary sound barriers when a road-construction detour has to be put in place through a residential neighborhood.)

Sound Deflecting Walls (for example to be used as a freeway sound barriers in circumstances where permanent walls are not possible.)

Temporary, outdoor music amphitheater shells.

Aircraft Engine Run Up Hangers/Areas (for military or civilian use.)

Because in certain aspects a fluid (gas or liquid) such as air is used to provide the necessary rigidity to the "supportive shell" (e.g., bladder) onto which the acoustic barrier material is applied, the combined materials remain light enough to make the system in accordance with the present invention easily portable/movable, allowing for the design and construction of structures appropriate for use even inside the average residential building, since they will generally weigh less per square foot than a waterbed.

For the uses described above, a fully-enclosed "room within a room," or a shell comprising various combinations of walls, ceiling and flooring that does not form a fully enclosed "room within a room," will provide useful sound attenuation characteristics that provide a user with a place to listen to or create relatively loud sounds, thus allowing one to avoid/limit the imposition of noise nuisance on those outside the structure, and/or provide a quiet room that keeps loud sounds out. Uses include, but are not limited to: a place in which to practice playing musical instruments or singing; a home-theater room in which one can listen to high-volume surround-sound systems; a place for children to play noisy games (such as video games, group board games or even the boisterous play of young children); and a quiet room for study, privacy, meditation or prayer.

The system is also preferably deployable outdoors. The panels are preferably waterproof and may be exposed to significant temperature fluctuations (heat and cold).

Thus, the present invention allows for the development of structures (as described, and others) with considerable soundproofing qualities that may be deployed in spaces or places that previously could not have easily or affordably accommodated such structures.

Additional Notable Aspects of the Invention:

Sound Attenuation Panel Couplers:

The sound attenuating panel couplers comprise a series of devices used to attach a set of sound attenuating panels together in order to form specific shapes and structure types. In certain aspects, a coupler also act as a noise-attenuating component in its own right, helping to prevent any "leakage" of sound through the cracks between each of the panels. A coupler device preferably includes a rigid structure. Coupler devices may take on many different shapes and sizes designed to facilitate joining together a series of panels at logical places (such as wall mid-sections, wall corners, ceiling pieces, etc.; see Figures). In certain aspects, a coupler device is also coated or covered with one or more layers of acoustic barrier (preferably a mass-loaded vinyl barrier) material.

For instance, using the sound attenuating panel couplers allows for the construction of inflatable enclosures such as rooms or partial rooms. Examples include practice studios, home theaters and game rooms larger than could be achieved with a single-piece design, or, using significantly larger variations of both the couplers and the inflatable sound attenuation panels, inflatable freeway sound walls and inflatable aircraft jet engine run up hangers.

Flooring:

A sound-insulating flooring system for structures made with the sound attenuation systems of the present invention may be included if desired, because some locations (such as basement recreation rooms for example) may not require a flooring system, while others, such as apartments with hardwood floors, carpeted floors, or tiled floors may each require a different type of treatment for optimal soundproofing. In one aspect, a flooring system includes one or more rigid sound attenuation panels deployed underneath the inflatable structure, (which may be made up of inflatable walls, an inflatable ceiling and a flooring material comprised of mass-loaded vinyl barrier sheathed in PVC but not using an air-chamber underfoot.) If desired, additional panels of the inflatable sound attenuation system may be inserted underneath a raised flooring system to provide additional sound attenuation qualities to the floors of any given structure.

Ventilation:

According to one aspect, an inflatable sound attenuating system panel and/or a single or multiple-piece room structures include features that allow for fresh air to be constantly circulated into the structure through the use of an optional fan/heating/cooling system that has noise-limiting features of its own. This ventilation system is comprised of a special "ventilation-facilitating" sound attenuating panel (or a section of the wall of the single-piece inflatable rooms) that has a series of baffled air conduits built into it (filtering through commercially available, non-toxic acoustic-barrier foam), so that air may be pushed through the walls, in both directions, while maintaining the maximum sound barrier qualities of the system. For example, in one aspect, air is pushed/pulled through the "ventilation-facilitating" section of the structure (e.g., panel and/or coupling element) using a commercially available fan, as depicted in the FIG. 10. In another aspect, the air flow is achieved by pushing/pulling air through small passageways in the coupling devices.

Power-Supply:

In one aspect, a power cord may be integrated with or inserted through a small, specially baffled/foamed "port" (giving it as much soundproofing quality as possible) in the corner of either one particular panel of a room assembled with panels or of a single-piece structure. The system may include built in power panels or plug systems as desired. For example, a coupling element or a panel may include an integrated power supply.

Lighting:

In one aspect, some or all of the panels used to construct a chamber, or parts of a single-piece room (window areas of panels and doors) may be constructed using lightly opaque or clear materials (both the material used to construct air chambers and mass-loaded vinyl are available in a variety of opacities), in order to let natural/room light into the structure, or users may use their own lighting devices as they choose inside the structure. The system may include lighting fixtures or systems as desired.

Inflatable Structures:

FIG. 10 illustrates a one-piece inflatable structure 400 according to one embodiment of the present invention. In this embodiment, the structure 400 includes one bladder or multiple interconnected bladders configured such that when inflated, an inner chamber is created. Where multiple interconnected bladders are used, fluid ports couple two bladders together so that a single pump system can inflate more than one bladder. The inner and/or outer walls of the chamber may include a sound attenuation material attached thereto, for example, one or multiple sheets of MLV attached to the bladder(s). The sound attenuation material sheet(s) may be pre-attached or attached by a user after the structure has been erected or inflated, partially or entirely. In certain aspects, the structure 400 includes an integrated self inflation device, although ports may be provided to allow for connectivity with an external pump. Inflation via fluid flow may be continuous or non-continuous. Air ventilation ports may also be provided to allow connectivity with an external ventilation system. An entry portion (e.g., door) is preferably provided to allow one to enter and leave the chamber. Additional support elements can be used to provide structural integrity.

Each single-piece structure (such as a practice room, home theatre, game room, etc.) is preferably equipped with one or more high-performance internal inflation pump(s), in order to allow users to simply plug in the device and inflate the room to its full size automatically.

Individual panels are equipped with one or more inflation valves that may either be used in conjunction with standard air mattress-type pumps (for smaller panels) or industrial-grade inflation devices (for freeway walls, airplane engine run up hangers, etc.) In one aspect, each panel includes an individual inflation device built into or otherwise integrated with the panel. The valve(s) may be placed on any surface of the panel, and more than one valve may be provided, in order to facilitate inflation and/or deflation of the panel at all times (e.g. if additional inflation of panels is desired when a wall or a room is already set up.)

For larger barriers, Helium or other low density gas may be used to inflate a panel. For example, the use of Helium provides additional support by helping to raise or lift the panel.

In one aspect, a panel, e.g., a bladder, might include a side pocket configured to receive and hold a rigid material such as a board so as to provide additional structural support. In certain aspects, systems and methods that provide continuous flow may be used, for example for larger, industrial scale bladders and/or other smaller bladders where it may be desirable to include leakage and continuous flow of fluid into the bladder.

Additional Features:

For each category of use possible for the inflatable sound attenuation system (such as soundproof rooms, freeway walls, airport hangers), a variety of colors/sizes/use categories are available. Examples of variations on soundproof rooms, for instance, include:

Sizes for Practice Studios:
  Individual-sized chambers for single instrument practice or a vocal booth.
  Practice rooms that hold larger groups of people/instruments.
  Longer/Narrower shaped rooms for enclosing an upright practice piano.
  Wider/Squarer shaped rooms for enclosing a grand piano.
Various colors for panels and structures, e.g., rooms and practice studios can be used:
Add-ons for various inflatable rooms might include:
  "Inflatable Recording Studio" with additional sound absorption material (e.g. egg shell foam) on the walls.
  "Inflatable Home Theater" with special containers built into the walls to hang/place various sizes of speakers.
  "Inflatable Play Room" with various types of child-safe play structures built into the chamber, such as a maze or mini-slides.

In one embodiment, a portable system such as a portable, inflatable "Instant Recording Studio" is provided in a container or carrying device such as a suitcase or a crate that can also be used as a table or stand. The carrying device or outer shell might include handles and roller wheels to facilitate transport, and the contents might include, in addition to the panels and connectors that would create one or more walls or a room, a built-in air circulation system and power supply for inflation of panel components making up the system.

In an alternative embodiment, an inflatable bladder is made up of a sound attenuating material so that additional sheets or layers of sound attenuating material (e.g., MLV) may not be needed. Likewise, in an alternative embodiment, the inflatable structures are made of, or covered with, a sound attenuating material. This may result in less sound attenuation but may provide for more portability.

For some structures, additional support may be desired to help support the panels or overall structure. Examples might include floor or wall braces and anchors and other similar bracing devices.

Preferably, a sound attenuation material (e.g., MLV) covers an entire bladder or the entire inflatable structure, inside and out. For example, a single sheet of MLV may be attached to multiple support bladders. Alternatively, only a portion or one side of a bladder may be covered, preferably such that when a structure is erected, the structure has sound attenuation material fully surrounding it, either interiorly or exteriorly, or at least on one side in the case where the structure is not fully enclosed.

A cover may be provided to cover components or completed structures if desired. The cover is preferably made of cloth or other suitable material to provide protection, decoration, alter the fragrance of the materials, etc.

In one aspect, a clear, rigid acrylic material is used to construct the coupling elements and support beams. For example, when combined with clear MLV and clear PVC air bladders of the panels, as much light from the outside as possible is allowed in to the structure (hence no electric lights are needed). In another aspect, the coupling elements and support beams are made of rigid, opaque PVC, for example where making a booth where darkness inside a booth is a desired feature (in which case an opaque MLV and air bladder would also preferably be used.)

FIG. 11 illustrates a top view of embodiments of panels 500 and 501 configured with connection elements or features. As shown, panel 500 includes a bladder having a female recession region 510, e.g., a "c"-shaped recession, configured to mate with a male connector region 520 of another bladder or other element. Panel 501 includes a two-pronged male connector region 521. FIG. 11*b* illustrates a plurality of bladders 501 in an interconnected configuration; a male region 521 mates with a female region 510. In certain aspects, inflation of interconnected bladders provides an air lock in the interconnected recession regions. In certain aspects, a support pole 530 or other structural element, e.g., beam, board, telescoping pole, etc., can be used to provide additional structural support as is shown in FIG. 11*b*.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, coupling elements and devices may also comprise an inflatable bladder. Therefore, the scope of the appended claims should be accorded the broadest interpretation so as to encompass all such modifications and similar arrangements.

What is claimed is:

1. An inflatable sound attenuation panel, comprising:
an inflatable bladder;
a first sheet of mass-loaded vinyl (MLV) attached to at least one surface of the bladder.

2. The panel of claim 1 further comprising:
a second sheet of MLV attached to a surface of the bladder opposite the first sheet of MLV.

3. The panel of claim 2 wherein the bladder is adapted to hold the first and second sheets of MLV planar parallel to each other at a first predefined distance for a first sound frequency at a first inflation and at a second predefined distance for a second sound frequency at a second inflation, thereby allowing for tuning the panel to optimally attenuate the first or second sound frequencies.

4. The panel of claim 1 wherein the bladder includes a plurality of inflation chambers.

5. The panel of claim 1 further comprising:
   means for coupling the panel to another like panel.

6. The panel of claim 5 wherein the means for coupling the panel include two inflatable male prongs on a first side of the bladder and a "c"-shaped recession on a second side of the bladder,
   wherein the two inflatable male prongs are configured to mate with a "c"-shaped recession of a bladder of the other like panel.

7. The panel of claim 5 further comprising:
   means for stacking the inflatable panels on top of one another to create a wall.

8. The panel of claim 5 wherein the means for coupling the panel include an element selected from the group consisting of a side-by-side connector element that couples two panels and a connector element that couples two panels in a non-linear fashion.

9. The panel of claim 1 wherein the at least one surface of the bladder has corrugated features.

10. The panel of claim 1 wherein the MLV comprises polyvinyl chloride (PVC) impregnated with a heavy metal.

11. The panel of claim 1 wherein the MLV is attached to the bladder using an adhesive or hook and loop fasteners.

12. The panel of claim 1 wherein the bladder is inflated.

13. A method of erecting a sound wall, comprising:
   setting on a horizontal surface a non-inflated gas bladder, the bladder attached to a first sheet of mass-loaded vinyl (MLV); and
   inflating the bladder so as to pull the attached sheet of MLV off the horizontal surface, thereby using gas pressure to erect a relatively heavy sheet of MLV.

14. The method of claim 13 wherein the bladder is attached to a second sheet of MLV opposite the first sheet of MLV and the bladder is adapted to hold the first and second sheets of MLV planar parallel to each other at a first predefined distance for a first sound frequency at a first inflation and at a second predefined distance for a second sound frequency at a second inflation, the method further comprising:
   inflating or deflating the bladder from the first to the second predefined inflation in order to tune the sound wall to optimally attenuate the second sound frequency.

15. The method of claim 13 further comprising:
   coupling the bladder with a second bladder; and
   inflating the second bladder such that the second bladder seals against the other bladder.

16. The method of claim 13 further comprising:
   coupling the bladder with a second bladder using a coupling device; and
   inflating the second bladder such that the second bladder seals against the coupling device and applies bias force on the coupling device against the other bladder.

17. The method of claim 13 wherein the bladder is inflated with helium, thereby providing buoyancy to help raise the sound wall.

18. A sound attenuation wall, comprising:
   sound attenuation panels, each panel having an inflatable bladder and a first sheet of mass-loaded vinyl (MLV) attached to a surface of the respective bladder, the MLV including polymer material; and
   coupling devices;
   wherein each panel is configured to seal against at least one of the coupling devices using a biasing force of internal gas pressure of the respective bladder.

19. The wall of claim 18 wherein each panel has a second sheet of MLV attached to a surface opposite the first sheet of MLV.

20. The wall of claim 18 wherein each bladder is adapted to hold the respective first and second sheets of MLV planar parallel to each other at a first predefined distance for a first sound frequency at a first inflation and at a second predefined distance for a second sound frequency at a second inflation, thereby allowing for tuning the wall to optimally attenuate the first or second sound frequencies.

21. The wall of claim 18 wherein each of the bladders is interconnected with fluid ports such that a single pump is enabled to inflate more than one bladder at one time.

22. The wall of claim 18 wherein the coupling devices are H-shaped.

23. The wall of claim 22 wherein the H-shaped coupling devices include vent holes.

\* \* \* \* \*